(No Model.) 2 Sheets—Sheet 1.
W. SCOTT.
VALVE FOR WATER CLOSETS.
No. 331,558. Patented Dec. 1, 1885.
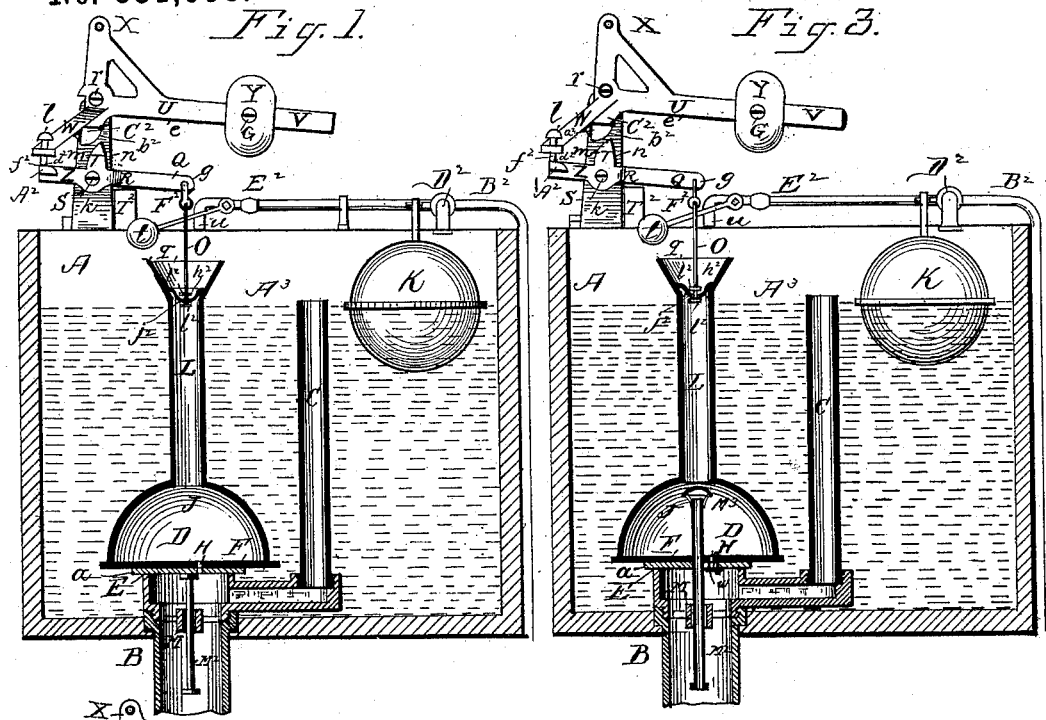
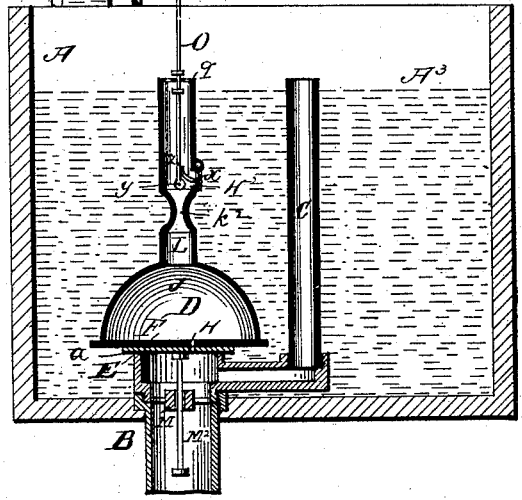
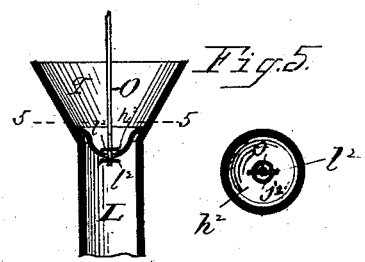
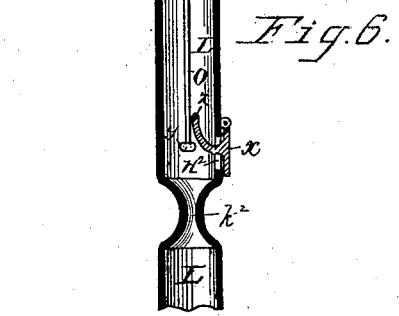
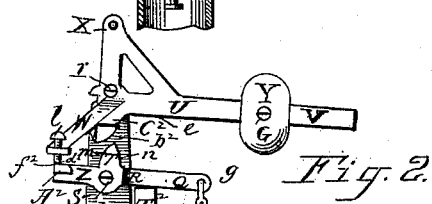
Witnesses
W. J. Bellme
H. M. Coney
Wm. Scott,
Inventor
per Brown Bros.
Attorneys.

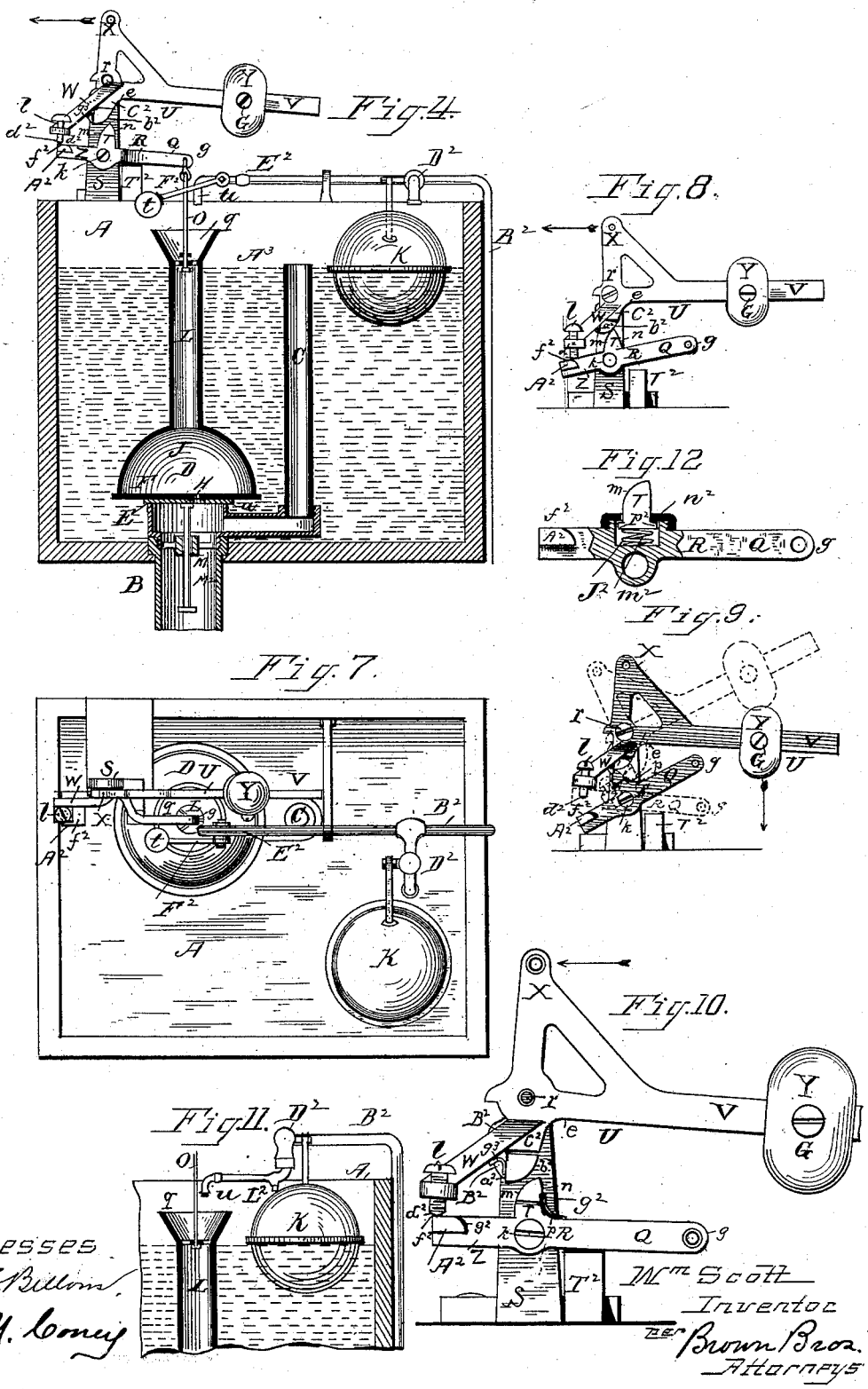

UNITED STATES PATENT OFFICE.

WILLIAM SCOTT, OF MALDEN, MASSACHUSETTS.

VALVE FOR WATER-CLOSETS.

SPECIFICATION forming part of Letters Patent No. 331,558, dated December 1, 1885.

Application filed November 26, 1884. Serial No. 143,912. (No model.)

*To all whom it may concern:*

Be it known that I, WILLIAM SCOTT, of Malden, in the county of Middlesex and State of Massachusetts, have invented certain new and useful Improvements in Valves for Water-Closets, of which the following is a full, clear, and exact description.

This invention relates to valves for the outlet or discharge passages of tanks or cisterns containing water or other liquid, and to the mechanism for operating said valves.

In substance the invention consists, first, in combination with the outlet-pipe or discharge of a tank or cistern containing water or other liquid, of a chambered or hollow valve which has one or more separate openings or passages for the ingress of water or other liquid or substance or material (preferably water or other liquid) to the chamber of the valve when the valve is off its seat or opened for the passage of water, &c., from the tank into the discharge-pipe, and without the then egress of air from the valve, and one or more for the egress of water from the chamber of the valve when the valve is closed, and the then egress and ingress of air, whereby when the valve is opened said valve will be weighted by and from the entrance of water or other liquid or other substance or material (preferably water or other liquid) into the chamber of the valve, through either one or more or all of said openings or passages, compressing the air in said valve, and the valve is thus weighted sufficiently to cause it to fall to its seat, or be seated, and when so seated allow, through one or more of said openings, the water, &c., with which the valve has been weighted, as aforesaid, to pass or escape therefrom through any suitable discharge, such as the discharge-pipe of the tank, or a pipe separate and distinct therefrom, in communication at such time with said opening or openings, while at the same time the air can pass in and out of the valve; second, in combining with the outlet-pipe or discharge of a tank or cistern containing water or other liquid a chambered or hollow valve which has openings or passages for the ingress and egress of water or other liquid or other suitable material or substance (preferably water or other liquid) to weight it, and is otherwise so constructed and arranged that seated, closing said discharge, it is incapable of itself of opening, but raised from its seat, opening said discharge, it so remains opened until from the ingress of water or other liquid or other suitable material or substance (preferably water or other liquid) from a supply outside of and independent of the water or other liquid which is in the tank, and the egress of air, it is caused to descend to its seat, again closing said discharge, and the water, &c., which has entered the valve while open then passes or discharges therefrom with a then ingress and egress of air, which thereby restores the valve to its normal condition, to be again lifted from its seat to open said discharge and to be then again closed by the ingress of water, &c., as stated, and so on as before; third, in combination with a valve, mechanism which is constructed and arranged, when properly operated, to open the valve, and after so opening it to leave it free to be closed independently thereof; and, fourth, in combination with a valve, mechanism which is constructed and arranged, when properly operated and during one operation thereof, to secure two openings of the valve, each followed by a closing thereof, which closing in the first instance is secured either directly from said mechanism or from the operation of the valve itself, according as a rigid or flexible connection between the valve and said mechanism is used, and in the second instance is secured substantially from the operation of the valve itself.

In the accompanying plates of drawings, Figures 1 and 2, Plate 1, and Fig. 4, Plate 2, are in illustration of the first part of the invention, and they are vertical sections of a tank, of its discharge-pipe and valve therefor, and of its overflow and air pipe, and an elevation of my improved mechanism for opening and securing a closing of my said valve, and of means for weighting the valve after it is opened to thereby close it, Figs. 1 and 4, independently of the water in the tank, in accordance with the second part of this invention, and, Fig. 2, from the water in the tank. Fig. 3, Plate 1, is a similar view to Figs. 1, 2, and 4, but in illustration of the second part of the invention. Fig. 4 has already been described in connection with Figs. 1 and 2.

Figs. 5 and 6, Plate 1, are views in detail, on an enlarged scale, of parts shown in Figs. 1 and 2, respectively, and hereinafter particularly referred to. Fig. 7, Plate 2, is a plan view of the apparatus shown in Fig. 4, same plate. Figs. 8 and 9 are detached views, in elevation, of my improved mechanism for raising and lowering the valve of the discharge-pipe of the tank, showing said mechanism in its different positions during its operation, all as hereinafter fully explained. Fig. 10 is an enlarged view, in elevation, of the valve-operating mechanism illustrating a modification in its construction. Fig. 11 is a view, in detail, in partial vertical section and elevation, illustrating a modification in the construction of the means of weighting the valve (from a source outside of the water in the tank after it has been opened) to secure its closing, all hereinafter fully explained. Fig. 12 is a view showing a modification in construction of valve-operating mechanism.

In the drawings, A is a water-tank.

B is a discharge-pipe leading from the bottom of the tank and connected with a water-closet, &c.

C is the air and overflow pipe in communication with the external air just above the stated or given level at $A^3$ of the water in the tank, and with the water-passage or discharge-pipe just below its communication at E with the water-tank, all as usual in the water systems of dwelling-houses, hotels, and other buildings.

D is a hollow chambered valve made of sheet metal or of other suitable material and of any suitable shape—as, for instance, hemispherical—and having a seat by its flat side F, provided with a washer or other packing or disk, $a$, of leather or of other suitable material, upon the upper edge or rim surrounding the opening E of the discharge-pipe B to the tank. The packing or washer $a$ secures close contact of the valve with its seat when it is resting thereon, and the valve seated extends or laps beyond the sides of said opening E of the discharge-pipe to the tank. The valve seated is below the water-level and wholly submerged in the water in the tank, and so seated the discharge-pipe is closed to the passage of the water from the tank through it.

L is a vertical tubular passage extending upward and perpendicularly from the center of the convex top of the valve to a point, Figs. 1, 2, 3, 4, and 11, preferably just above the given or stated level at $A^3$ of the water in the tank. This passage is for the ingress and egress of air to and from the valve-chamber, as shown in Fig. 4, and for the ingress of air to the valve-chamber, as shown in Figs. 1, 2, and 3, and also for the ingress to the valve-chamber of water, as illustrated, or of other liquid, or of other suitable material or substance, either from or independent of the water in the tank, and when independent of the water in the tank, either water or any other liquid or other suitable material or substance, preferably water, may be used for the purpose of weighting thereby the valve.

Figs. 1, 3, and 4 (also 6 in modification) show the apparatus as designed for a feeding of water or other liquid to the chamber J of the valve D through the vertical passage L from a source outside and independent of the water in the tank; and Fig. 2 shows the apparatus as designed for a feeding of water to the chamber of the valve through the vertical passage L from the water in the tank.

H is an opening through the flat side of the valve, and when the valve is closed makes communication between the valve-chamber and, as shown, the water-passage of the discharge-pipe B of the tank; or it may be a separate suitable discharge, and it is for the egress of the water, &c., with which the valve has been charged to weight it.

$M^2$ is a perpendicular stem attached to the flat side of the valve, (shown as tubular in Fig. 3, entering the valve-chamber, and extending to near its top, open at each end,) and projecting downwardly therefrom through a fixed guide-collar, M, centrally located in the discharge-pipe, and open around and between it and the inner vertical wall of said pipe, to allow the water from the tank to pass by it, and thence downward through said pipe. This stem $M^2$ and collar M guide the valve in its upward and downward movement for the opening and closing of the water-passage of the discharge-pipe B. The upper end of the upward projecting tubular passage L of the valve D is preferably made flaring or funnel or basin shape, as shown.

O is a rod hung at one and its lower end to a suitable support at the upper end of said passage L, and at its other and upper end to the end $g$ of one arm, Q, of a lever, R, turning upon a fixed horizontal fulcrum-pin, $k$, of a fixed standard or upright, S, which is either supported, as shown, upon the top of the water-tank or upon any other suitable support therefor. This lever R at rest and in its normal position, Figs. 1, 2, 3, 4, and 10, dotted lines, Fig. 9, rests by its lower edge upon a fixed abutment or support, $T^2$, therefor of the standard S, and in this position of the lever the valve is on its seat of the discharge-pipe B, closing said pipe, as before stated, to the passage of water from the tank. The lever R is the valve-lever of the operating-levers of this invention for the valve D, and will be hereinafter so called for convenience of designation.

T is a nose or projection extending upward from the upper edge, $d$, of the valve-lever, and in Figs. 1, 2, 3, 4, and 8 shown as rigid or unyielding, and in Figs. 9 and 10 shown as hinged to the lever at its side $g^2$ toward the end of the lever connected to the valve and abutting against the upper edge of the lever R, with a bent spring, $p$, bearing upon and against its said side, at which it is hinged, as described. This nose is rounded at its upper end and also along its side $m$ opposite to its hinged side $n$, and at its hinged side it is preferably made straight, or substantially so. The arm Z of the lever R on the opposite side of the fulcrum-pin $k$ of the lever to that connected with the valve has a bearing-surface, $f^2$, located on the upper side of a projection, $A^2$, from one side and extending along and for a portion of the length of said arm. This surface $f^2$ makes a bearing for the end $d^2$ of an adjustable screw or other pin, $l$, preferably an adjustable one, set in the end of the downwardly-projecting arm W of a lever, U, situated above the valve-lever R, and hung upon a fixed horizontal fulcrum-pin, $r$, of the standard or upright S, before referred to, and which lever at its crank portion X, projecting from its upper edge, is to be suitably connected, by a chain, or otherwise, to any suitable operating device—as, for instance, to the floor, or door, or seat of a water-closet, or to a handle, knob, or other pull. This lever U is the operating-lever of the lever mechanism of this invention for the valve, and will be hereinafter so called for convenience of designation.

V is an arm of operating-lever on the opposite side of its fulcrum $r$ to that of the arm X, and Y is a weight applied to said arm for the working of the lever, as will hereinafter appear. The weight Y is fastened by a set-screw, G, and is arranged otherwise in any suitable manner for being adjusted and set in position upon the lever-arm V, as it may be desired to increase or decrease the force or power of the leverage of said arm.

$C^2$ is a nose or projection extending downward from the under edge, $e$, of the operating-lever and situated thereon, when said lever and the valve-lever are both in their normal positions, Figs. 1, 2, 3, 4, and 10, so as to be at one side of the nose T of the valve-lever R and in the same plane vertical therewith, and between said side $m$ of the nose T and the bearing $d^2$ of the arm W of the operating-lever upon the arm of the valve-lever at $f^2$. This nose $C^2$ of the operating-lever is rounded at its outer and lower end and also at its vertical edge $b^2$, which is toward the nose of the valve-lever when the two levers are in their normal positions, Figs. 1 to 4, and 10, and straight, or substantially so, at and along its vertical edge $a^2$, opposite to its rounded vertical edge $b^2$. Again, the nose of the operating-lever is hinged at its straight edge to and butted against the lower edge of the lever, and a bent spring, $g^3$, is applied to and bears upon said hinged edge $a^2$ to hold the nose to its said abutment on the lever until its pressure is overcome by working against the nose on its opposite edge, $b^2$.

The hinging of and spring application to the two noses T and $C^2$ of the two levers is practically the same, but on opposite sides thereof, when both levers are in their normal position. If the nose of the valve-lever is hinged, as described, the nose of the operating-lever may be rigid or unyielding, and vice versa, or both may be hinged, as described, all as will be more plainly apparent hereinafter.

K is the usual ball-float, and connected to a cock or faucet, $D^2$, for securing a supply of water to the tank as the water is drawn off from the tank, all as usual. The ball-cock is supplied from a feed-pipe, which, as shown in Figs. 1, 3, 4, and 7, is extended, suitably supported, to and over the upper open end, $q$, of the upwardly-extending tubular passage L of the valve to the discharge-pipe, where it is turned downward or in a direction to discharge the water passing through it into the open upper end of said passage. This extension $E^2$ of the feed-pipe for the ball-cock is provided with a suitable cock for opening and closing it, and this cock has an arm, $F^2$, weighted at its outer end, $t$, and crossing the upper open end of the valve-passage L, Figs. 1, 3, and 4, so that by the lift of the valve from its seat said arm will be lifted thereby, and thus the cock, to which it is connected, and which is located in the feed-pipe $E^2$, will be opened for the passage of water through it and out at its discharging end $u$ into said valve-passage. Pulling forward—that is, in the direction of the arrow, Figs. 1, 2, 3, 4, 8, and 10—upon crank-arm X of the operating-lever, which is connected, as described, for so working said lever, raises its arm V against its weight Y, and in this movement of the operating-lever the horizontal bearing-surface $d^2$ of its arm W works downward against the upper horizontal bearing-surface, $f^2$, of the arm Z of the valve-lever R, and thereby raises the other arm, Q, of said valve-lever, to which the valve is hung, and through it the valve is raised. By the so continued movement of the two levers the bearing-surfaces $d^2 f^2$ of operating and valve levers R U escape from each other at the end $g^2$ of the bearing-surface $f^2$ of the valve-lever, and at or about the time of such escape the bearing-surfaces $b^2 m$ of the noses $C^2$ T of the operating and valve levers, come to a bearing against each other, and thus the valve-lever is forced back to its rest on the abutment $T^2$ therefor, securing by the continued ride and pressure of said surfaces upon each other a yielding and swinging of the one or of the other or of both of the noses of the levers against their respective springs, according as either the one or the other or both of said noses are hinged, as aforesaid, upon their respective levers, sufficient for the nose of the operating-lever to pass over and by the nose of the valve-lever, which lever is then at rest, and to the opposite side, $n$, of nose T of said lever, and into a position in which its straight bearing-surface $a^2$ is presented to straight bearing-surface $n$ of said nose T, on which the hinged nose or noses so swinging return to their abutments on the respective levers. These straight bearing-surfaces $a^2 n$ of the noses of the two levers R and U remain in this position so long as the power or force applied to the operating-lever to move it in the direction above stated is continued. The return of the valve-lever to its rest, as above described, forces through the rigid wire connection of the valve therewith a return of the valve to its seat. On a release of the operating-lever, when its nose $C^2$ and the nose T of the valve-lever have their bearing-surface presented to each other, as above described, the weighted arm of the operating-lever then works to return said lever to its normal position, and in so returning the edge $a^2$ of its nose $C^2$ works against the bearing-surface or edge $n$ of the nose T of valve-lever, and thereby raises the arm Q of said lever, lifting the valve from its seat, if it is then seated, and opening the water-passage B, if it is then closed, and at the same time the nose $C^2$ of the operating-lever, riding over the nose T of the valve-lever, finally passes to the side thereof at which it was and from which it passed during the raising of the arm Q of the valve-lever, and the opening of the valve and water-passage from the working of the bearing $d^2$ of operating-lever upon the bearing $f^2$ of valve-lever before described, and the lever U itself into its normal position and rest against the abutment $B^2$ therefor. After the nose of the operating-lever has passed the nose of the valve-lever, as described, the valve-lever and also the valve are released to their own motions, the lever to return to its rest upon its rest-block $T^2$ and the valve to return to its seat, as and in the manner hereinafter described. With the two levers again in their normal positions they are in readiness for another operation thereof and of the valve, as described.

From the above description it is apparent that a continuous forward pull upon the crank of the operating-lever, or, what is the same, a downward pull upon the arm of such lever, secures, first, by the working of the bearing-surfaces $d^2 f^2$ of it and of the valve-lever, to which the valve is hung, and a consequent lifting of the valve from its seat, and, second, an escape of such surfaces one from the other, and a then working of the bearing-surfaces $b^2 m$ of said levers, which forces the valve-lever to its rest on its abutment, and with a rigid connection of the valve to said lever, thereby positively secures a closing of the valve upon its seat, followed by the then return of the operating-lever, if the force applied to it to pull its end downward, as described, is removed, which, by the working of the bearing-surfaces $a^2 n$ of the levers again secures a lifting of the end $g$ of the valve-lever and of the valve, until said working-surfaces pass from their contact and the operating-lever has come to a rest against its abutment $B^2$, leaving the valve-lever and its valve free, the one to return to a rest on its abutment and the other to close on its seat.

In Figs. 1, 2, 3, 4, and 10, as before stated, the levers R and U are shown in their normal positions with the valve closed. In Fig. 8 they are shown in position just as their bearing-surfaces $b^2 m$ are escaping from each other, with the valve-lever raised and their bearing-surfaces $b^2 m$ in position to then, on a continued pull of the operating-lever, work to return the valve-lever to its rest, and in Fig. 9 the levers are shown in their position on the return movement of the operating-lever from the action of the weighted arm V, and their bearing-surfaces $a^2 n$ just on the point of passing from each other, and the valve-lever raised, and by dotted lines the levers are shown in their position to work by their bearing-surfaces $a^2 n$ to lift the valve-lever on the return movement of the operating-lever, caused by the action of its weighted arm, the valve-lever then being on its rest or abutment. When the valve is lifted from its seat, opening the discharge-pipe B of the tank, in the first operations of the levers R U, above described, to raise the valve-lever, as the connection between the valve and its lever is a rigid one, by the positive return of the valve-lever directly following the lifting thereof in the continued pull downward on the operating-lever, as described, the valve is thereby positively returned to its seat, closing the discharge-pipe B. When the valve is lifted from its seat, opening the discharge-pipe B of the tank, in the second operation of the levers R U, as described, to raise the valve-lever, and as this lifting of the valve-lever and its valve is directly followed by a release thereof to their own motion, the return of the valve-lever to its rest and of the valve to its seat to close the discharge-pipe is practically from the entrance of water, &c., into the chamber of the valve, as hereinafter described, which weights the valve sufficiently, and thereby causes it to be seated, returning at the same time the valve-lever to its rest on the abutment $T^2$ and placing the water-passage H through the bottom of the valve in communication with the discharge-pipe for the then discharge from said water-passage and through said pipe of the water, &c., previously entered into the valve-chamber, and thus the valve is rendered capable of another operation, as before. In the drawings for this weighting of the valve with water two sources of supply and means of operation are shown, one consisting, as shown in Figs. 1, 3, 4, and 7, in the use of a supply separate and distinct from the water which is in the tank, and the other consisting, as shown in Fig. 2, in the use of the water only in the tank. A supply of water separate from the water in the tank for weighting the valve, as illustrated in Figs. 1, 3, and 4, is secured from the opening of the cock at $u$ in the extension $E^2$ of the supply or feed pipe for the ordinary ball-cock and its discharge to the valve caused by the abutment of the upper end, $q$, of the tubular passage L of the valve against the lever $F^2$ of said cock as the valve is lifted from its seat during the operation of the lever mechanism described, and also from the then egress of the water in the tank through the water-passage H in the flat side of the valve, which passage is then opened (if a flap-valve or other valve is not provided to close said water-passage thereto, Fig. 3) for the water of the tank to so flow.

The flap-valve $w$, just above referred to, is located upon the outside of the bottom flat side of the valve, and it is hinged at one side and is arranged to swing downwardly, and when used the only supply for weighting the valve, as described, Figs. 1, 3, 4, and 7, is a supply separate from the tank—as, for instance, the supply-pipe $B^2$—for the reason that the pressure of water in the tank against the flap-valve necessarily holds it closed and from opening from the ingress of water to the valve, as described.

In the use only of the water in the tank, as shown in Figs. 2, 6, the water enters both through the water-passage H in the flat side of the valve and through a water-passage, $H^2$, in the side of the vertical tube-passage L, provided with a hinged flap-valve, $x$, on the outside of the tube for closing it, but which, just before the valve is lifted, is opened, and as its stem is pulled upward by the then operation of the round-headed end $y$ of the valve-stem O against the cam projection $z$, attached to and extending from the flap-valve through the water-passage $H^2$ into the tubular passage L. When the valve is seated and the stem O in its normal position, the bearing of the head $y$ of the stem upon the cam projection $z$ of the flap-valve in the tubular passage is then off, leaving said valve free to be closed, and to be held closed, making a water-tight seat against the outside of the wall of said tubular passage. The return of the valve to its seat, using an extra supply at $u$ for water to the valve-chamber, leaves the lever of the cock for opening it for said supply free to fall and thus to close said cock and shut off said supply, and the return of the valve to its seat, using only the water of the tank by admitting it to the valve-chamber at the side water-passage of the tubular passage L, sets the flap-valve free to close said water-passage by the pressure of the water in the tank. The levers are preferably constructed and arranged to lift the valve to a lesser height on the forward movement than on the return movement of the operating-lever, and the lever of the cock regulating the supply of water to the valve and the top of the tubular passage L are arranged in said relation to each other that the lifting of the valve in the forward movement of the operating-lever will not open the cock to the supply of water to the valve, but leave the valve to be closed by the suction of the water passing through the discharge-pipe combined with the forced return, as described, of the lever to its abutment, if a rigid connection is made between the valve-lever and the valve, or by the force of suction, above referred to, alone if a flexible connection—such as a chain— is made between the valve-lever and the valve. Again, when the valve is provided with the passage for the entrance thereto of water from the tank, as has been described, and as particularly shown in Fig. 2, obviously, with levers arranged as just above described to lift the valve to a lesser height on the first lifting movement thereof than on the second, but little water, if any, will then pass from the tank into the valve-chamber through such water-passage, as the valve to said passage will be opened but for a comparatively short time, and the seating of the valve will be secured rather and practically from the suction of the water rushing from the tank through the discharge-pipe, if a flexible connection—such as a chain— is used between the valve and its lever, and if a rigid connection—such as a rod—is used, then practically from the forced return of the valve to its rest.

The first lifting of the valve, as described, is for securing a "preliminary wash," as it is termed, of the water-closet bowl, &c., and the second for securing an "afterwash," as it is termed, thereof, and the preliminary wash is to be small in quantity in comparison with that of the afterwash, and so the levers are arranged to close the valve after its lift for the preliminary wash and to leave the valve free to its own closing action after the afterwash.

The supply of water to weight the valve, as herein described, can be either with or without the escape of air from the valve-chamber by allowing it to either pass or not through the passage by which the water is entered into the valve, or through a passage separate therefrom and not in communication with the supply of the water to the valve, whether said supply is from the water in the tank or from an outside supply, and in the drawings, Figs. 1, 2, 3, and 4, constructions are shown designed for the several results stated.

In Figs. 1, 3, and 5 the water from the outside supply falls into a catch-basin-shaped depression, $h^2$, and from thence through the reduced opening $j^2$ thereof. To receive the valve-rod, the water passes into the tubular passage L, and from that to the valve-chamber proper. By this construction no air can pass out of the valve as the water from the outside supply is being entered into it, for the reason that the water in catch-basin $h^2$, necessarily at all times then in the basin, seals the water-passage therefrom to the egress of air from the valve-chamber, and as in Fig. 1 no other way except this passage is provided for the escape of air as the same is being weighted with water, plainly there is no egress of air from the valve. The egress of air from the valve-chamber, however, is permitted by the construction of the valve shown in Fig. 3, with a downward-projecting air-tube, while not permitted by the opening in the basin-shaped depression, through which a supply of water is had to the valve-chamber from an outside source.

In Figs. 2 and 6 the opening, as at $k^2$, for the entrance of water to the valve-chamber proper of the valve is, by the basin shape above it, sealed by water, when water is passing to the valve-chamber to the egress of air from the valve.

In Fig. 4 air passes into the valve-chamber with the water, as water is entered therein, and in all, after the valve is seated, air can enter into the valve-chamber between the valve and its rod O.

The shouldering of the valve-rod for the suspension of the valve from the rod is preferably by a cross-pin, $l'$, below and above its point of suspension from the valve. (See Figs. 5 and 6 particularly.)

The noses of the levers may be arranged to yield for the operation stated, in the movements of the levers, in other ways than that particularly described and shown—as, for instance, as shown in Fig. 12, which consists in setting them in a socket, $J^2$, of the levers R U, and supporting them upon an elastic cushion or spring, $M^2$, and said socket and noses shouldered, as at $n^2$ $p^2$, to prevent accidental escape of the noses from their sockets.

The chambered valve, if it is to float when opened, requires to be of a size and capacity for floating sufficient to offset its own weight and the increased weight upon it from its weighted lever $F^2$ of the water-supply cock $u$, and the resistance thereof in opening it. The weighted lever of the supply-cock closes the cock as the valve returns to its seat and is seated.

The opening of the supply-cock at $u$ may be secured from the movements of either the valve-lever or the operating-lever during their operation by properly connecting the cock directly to the lever or otherwise, but the arrangement of parts for opening it and permitting it to close, herein described, is effective and practical.

The supply-cock for the valve D may be the ball-cock K of the tank A instead of a separate cock, $u$, as described, and thus the supply of water to the valve secured from the opening of said ball-cock by the fall of the water in the tank. In this case the water-passage from the ball-cock should be run not only to discharge water into the tank, but also into the valve, all as shown at $L^2$ in Fig. 11.

The bent springs herein described as applied to the noses of the operating and valve levers in either case, may be dispensed with should the nose be situated so as to be capable of itself of returning—that is, from the action of gravity.

Concerning the mechanism herein described through which the valve is opened and allowed to close, it is apparent that the operating-lever has a reciprocating movement, that in the movement of the operating-lever in one direction it works by a face, $d^2$, thereof, against a face, $f^2$, of an abutment which is connected to the valve, and thus the operating-lever raises or opens the valve, and after so opening the valve in the continuation of the movement of the operating-lever in the same direction the said working-face $d^2$ of said lever escapes from the said working-face $f^2$ of said abutment of the valve, and thus leaves it (the valve) free to close; and, furthermore, it is apparent that in the movement of the operating-lever in the other direction said lever works by a face, $a^2$, thereof against the face $n$ of said abutment, and thus the operating-lever again raises or opens the valve, and after so opening the valve, in the continuation of the movement of the operating-lever in the same direction, the said working-face $a^2$ of said lever escapes from the said working-face $n$ of said abutment of the valve, and thus leaves it (the valve) again free to close, and brings the working-face $d^2$ of said lever, which worked against said working-face $f^2$ of said abutment of the valve, in the previous movement of the lever, and thus lifted the valve, as aforesaid, to position for operation to again lift or open the valve when the operating-lever is again moved in the proper direction therefor. Again, other liquids than water may be used, and also any other material or materials or substances which may be suitable and desirable for supplying and weighting the valve as described. When an outside supply is used, water is preferable, as is obvious without further comment, and without material or substantial change in the construction and arrangement of mechanism to open and shut off the supply thereof, as described, other liquids or substances might be used.

The discharging of the valve D may be through a pipe separate and distinct from the discharge-pipe of the tank, suitably located to make connection and communication with the discharge-opening of the valve when the valve is closed.

The tube of the valve through which to supply the valve with water, &c., to weight it, as described, may be made the overflow-pipe of the tank, and thus dispensing with the separate overflow-pipe C, before referred to, in which case it would be best to enlarge the discharge port or opening of the valve when seated.

The lever mechanism herein described obviously may be used with valves of other constructions thereof, and it is not intended to limit said mechanism of itself to the particular valve shown, or otherwise to any of the other features of this invention shown in connection with it, nor is it intended to limit the other features of the invention to the particular lever mechanism shown and described.

From the description given it plainly appears that valves are shown constructed and arranged, first, with separate openings, one or more or all for the ingress of water, &c., to a chambered and float valve, with no egress for the air in the valve to weight it, and thereby to close it, and one opening or more, but not all, for the egress of water, &c., used to so weight the valve and the ingress of air; second, with an opening or openings for the ingress of water, &c., from a source outside of the liquid in the tank to the discharge-pipe of which the valve is applied to weight the valve to seat it, and an opening for the discharge of said water so entered into the valve therefrom after the valve is seated.

The operating and valve levers, as particularly described, are constructed to give two washes through the bowl, &c.; but plainly the "preliminary wash," as it is called, may be dispensed with by simply removing the bearing-surfaces $d^2 f^2$ of the two levers.

The air-tube or guide-rod $M^2$ (shown in Fig. 3) is protected against the entrance of water by a cap, $M^3$, and still allowing the free passage of air, as desired.

Having thus described my invention, what I claim, and desire to secure by Letters Patent, is—

1. A tank for a liquid, an outlet-pipe for the liquid, and a chambered valve for said pipe, adapted to be opened and closed, and having passages adapted, when the valve is opened, to admit water or other liquid, &c., to the valve, for weighting it, from a source or supply separate or distinct from the liquid in the tank, and to discharge said liquid, &c., so admitted to the valve therefrom when the valve is closed, in combination with a separate or distinct supply of liquid, &c., provided with a valve adapted to be opened on the opening and to close in relation to the closing of the valve, substantially as described, for the purpose specified.

2. A tank for a liquid, an outlet-pipe for the liquid, and a chambered valve for said pipe, adapted to be opened and closed, and having passages adapted, when the valve is opened, to admit a liquid to the valve for weighting it, and to discharge said liquid so admitted to the valve therefrom when it is closed, in combination with a valve adapted to be opened in relation to the opening of said chambered valve, for then admitting liquid to said valve, and to be closed in relation to the closing of the valve, substantially as described, for the purpose specified.

3. A tank for a liquid, an outlet-pipe for the liquid, and a chambered valve for said outlet-pipe, adapted, to be opened and closed, and having passages adapted, when the valve is opened, to admit a liquid, &c., to the valve, for weighting it, from a source or supply separate and distinct from the liquid in the tank, and to prevent the then ingress of air to and egress thereof from the valve, and to discharge said liquid, &c., so admitted to the valve therefrom when the valve is closed, in combination with a separate or distinct supply of liquid, &c., provided with a valve adapted to be opened on the opening and to close in relation to the closing of the valve, substantially as described, for the purpose specified.

4. A tank for a liquid, an outlet-pipe for the liquid, and a chambered valve for said pipe, adapted to be opened and closed, and having passages adapted, when the valve is opened, to admit a liquid to the valve for weighting it, and to prevent the then ingress of air to and egress thereof from the valve, and to discharge said liquid so admitted to the valve therefrom when the valve is closed, in combination with a valve adapted to be opened on the opening of said chambered valve, for then admitting liquid to said float-valve, and to be closed in relation to the closing of the valve, substantially as described, for the purpose specified.

5. A tank for a liquid, an outlet-pipe, B, for the liquid of the tank, and a chambered valve, D, for said pipe, adapted to be opened and closed, and having passages E and H, adapted, when the valve is opened, to admit liquid to the valve, for weighting it, from a source or supply, $E^2$, separate or distinct from the liquid in the tank, and to discharge said liquid so admitted to the valve therefrom when the valve is closed, in combination with a separate or distinct supply, $E^2$, of liquid, provided with a valve adapted to be opened on the opening and to close in relation to the closing of the valve, substantially as described, for the purpose specified.

6. A tank for a liquid, an outlet-pipe, B, for the liquid of the tank, and a chambered valve, D, for said pipe, adapted to be opened and closed, and having passages E, H, and $M^2$, adapted, when the valve is opened, to admit liquid to the valve, for weighting it, from a source or supply, $E^2$, separate or distinct from the liquid in the tank, and to allow air to escape from the valve and to discharge said liquid so admitted to the valve therefrom when the valve is closed, and at the same time to admit air thereto, in combination with a separate or distinct supply, $E^2$, of liquid, provided with a valve adapted to be opened on the opening and to close in relation to the closing of the valve, substantially as described, for the purpose specified.

7. In combination, a tank for liquid, an outlet-pipe to said tank, an opening and closing valve to said outlet-pipe, a reciprocating lever for operating said valve, and a part connected to said valve as an abutment for said lever, and said operating-lever and said valve abutment constructed with faces, at least one of which is made separate therefrom and attached thereto and is yielding, to have in one movement of said lever a working contact with each other and in the other movement thereof a yielding movement and non-working contact, whereby in the one movement the valve will be opened and released to close and in the other the lever can return to position to again open the valve, substantially as described.

8. The combination, with a tank for liquid, an outlet-pipe for the liquid, and a valve to said outlet-pipe, adapted to be opened and closed, of two pivoted levers, R U, for operating said valve, provided with two sets of bearing-surfaces, $b^2$ and $m$ and $a^2$ and $n$, the one set, $b^2$ and $m$, adapted to yield in one or the forward movement of the lever U, for the passage of the other set, $a^2$ and $n$, of said surfaces into a position for action thereof in the other or return movement of the lever U, substantially as described, for the purpose specified.

9. The combination, with a tank for liquid, an outlet-pipe for the liquid, and a valve to said outlet-pipe, adapted to be opened and closed, of two pivoted levers, R U, for operating said valve, provided with three sets of bearing-surfaces, $d^2$ and $f^2$, $b^2$ and $m$, and $a^2$ and $n$, adapted in one or the forward movement of the lever U for the set $d^2$ and $f^2$ to work and finally to escape from each other, and for the other set, $b^2$ and $m$, to yield for the passage of the other set, $a^2$ and $n$, into a position for action thereof in the other or return movement of the lever U, substantially as described, for the purpose specified.

10. The combination, with a tank for liquid, an outlet-pipe for the liquid, and a valve to said outlet-pipe, adapted to be opened and closed, of two pivoted levers, R U, for operating said valve, provided with noses $C^2$ and T, hinged to and butted and both made with two sets of bearing-surfaces, $b^2$ and $m$ and $a^2$ and $n$, the one set, $b^2$ and $m$, to yield in one or the forward movement of the lever U, for the passage of the other set, $a^2$ and $n$, of said surfaces in a position for action thereof in the other or return movement of the lever U, substantially as described, for the purpose specified.

In testimony whereof I have hereunto set my hand in the presence of two subscribing witnesses.

WILLIAM SCOTT.

Witnesses:
 EDWIN W. BROWN,
 WM. S. BELLOWS.